United States Patent [19]

Sunada et al.

[11] Patent Number: 5,018,015
[45] Date of Patent: May 21, 1991

[54] ADAPTIVE KEYED SYNCHRONOUS DETECTOR

[75] Inventors: Koichi Sunada; Hiroshi Sato, both of Osaka, Japan

[73] Assignee: NEC Home Electronics Ltd., Osaka, Japan

[21] Appl. No.: 459,274

[22] Filed: Dec. 29, 1989

[30] Foreign Application Priority Data

Dec. 31, 1988 [JP] Japan ................................. 63-333176

[51] Int. Cl.$^5$ .......................... H04N 5/44; H04N 5/04
[52] U.S. Cl. ..................................... 358/188; 358/158
[58] Field of Search .................... 358/19, 23, 148, 149, 358/158, 160, 188

[56] References Cited

U.S. PATENT DOCUMENTS 4,694,327  9/1987  Demmer et al. ...................... 358/23
4,700,217 10/1987  Balaban et al. ....................... 358/23
4,930,003  5/1990  Hosoya ................................. 357/19

Primary Examiner—John W. Shepperd
Assistant Examiner—Michael D. Parker
Attorney, Agent, or Firm—Cushman, Darby & Cushman

[57] ABSTRACT

A keyed type synchronization wave detecting circuit comprises a phase wave detector for synchronizing and wave detecting a composite video signal responsive to a signal for wave detection. A synchronizing signal generator provides a horizontal synchronizing signal controlled by the frequency of a horizontal synchronizing signal of the composite video signal. A keying pulse generator provides a keying pulse signal from the synchronizing signal of the synchronizing signal generator. A phase controller outputs a phase difference signal in accordance with the difference in phase between the signal for wave detection and a carrier of the composite video signal such that the phase difference approaches a predetermined level, the phase controller having a comparator for performing a keying outputting operation of the phase difference signal by the input of the keying pulse signal, and a filter for removing the high frequency component of the phase difference signal and forming a control signal. A lock detector controls the output of at least the keying pulse signal to the phase controller when it is detected that the signal for wave detection is phase-locked to the carrier. Means are provided for generating the signal for wave detection synchronized with the carrier based on the control signal.

4 Claims, 1 Drawing Sheet

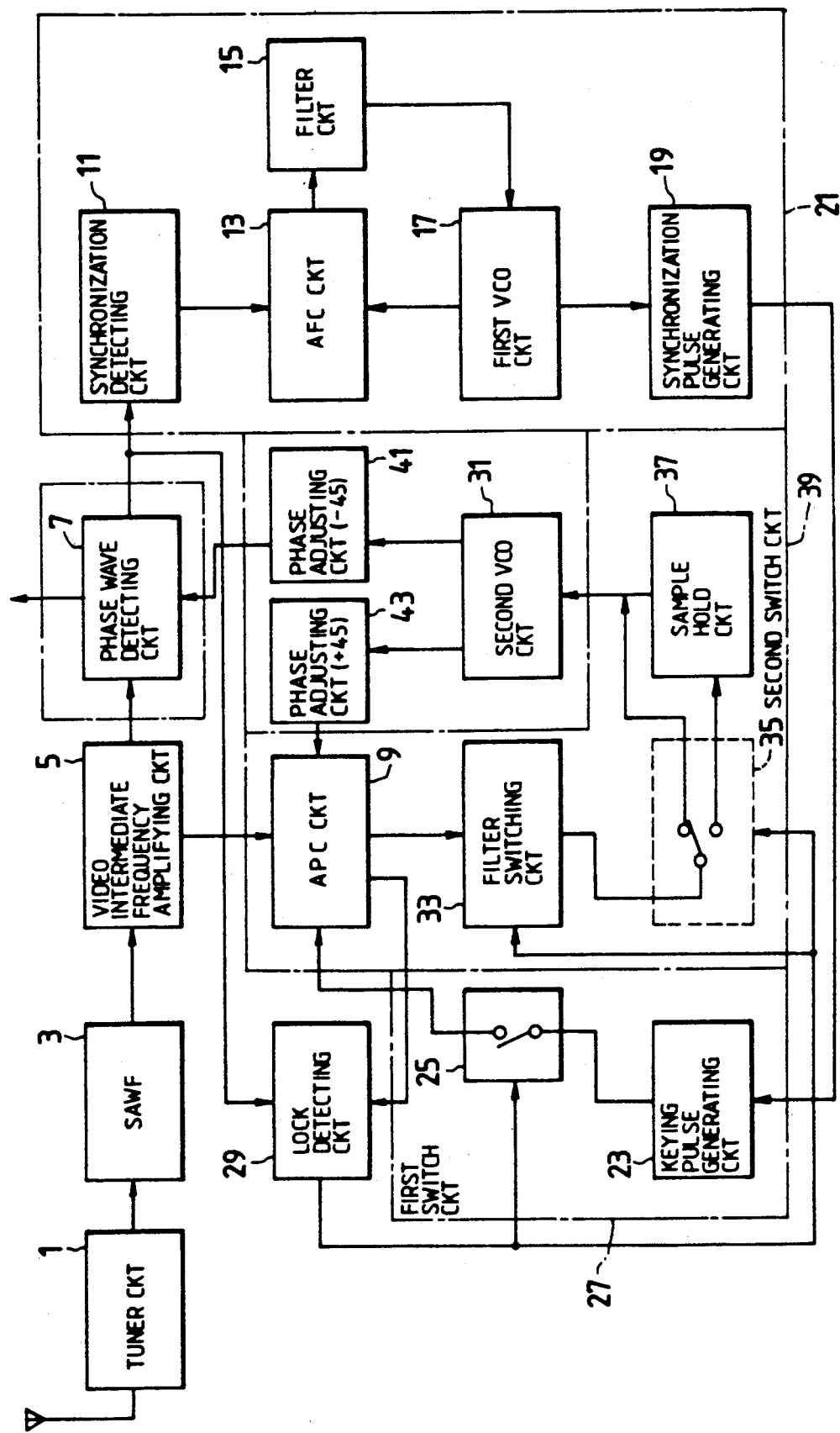

ADAPTIVE KEYED SYNCHRONOUS DETECTOR

BACKGROUND OF THE INVENTION

1. Field of the Invention

The present invention relates generally to synchronization wave detecting circuits. More particularly, the invention is directed to an improved keyed type synchronization wave detecting circuit that is highly suitable for use as a video wave detecting circuit of a color television receiver.

2. Description of Related Art

There are two main types of synchronization wave detecting circuits. The first of these types is a so called "sequential" system which carries out synchronizing operation and wave detection by using a signal for wave detection that is sequentially synchronized with a carrier of a received signal. The second of these types is a so called "keyed" system which carries out synchronizing operation and wave detection using a signal for wave detection synchronized with the carrier every predetermined short interval.

The circuit arrangement of a sequential-type system is relatively simple, however in operation it tends to become unstable. Signal distortion can occur during wave detection when the voltage level of the received signal changes and when noise and/or ghost signals are superimposed on the received signal.

The use of a keyed-type system overcomes, to a certain extent (not completely), the problems associated with the operation of the sequential-type system. The keyed-type system can be operated in a manner such that the signal for wave detection is phase-locked to the carrier of the received signal. However, the operation of the wave detecting circuit occasionally tends to become unstable until the signal for wave detection is phase-locked to the carrier of the received signal.

In particular, when the voltage level of the received signal is varied and/or the waveform of the received signal changes by passing through a nonlinear circuit, the operation of the wave detecting circuit occasionally tends to become unstable. Such a problem is not negligible and must be overcome to achieve practical operation.

SUMMARY OF THE INVENTION

In order to overcome the above-mentioned problems associated with known synchronization wave detecting circuits, an object of the present invention is to provide a keyed type synchronization wave detecting circuit that can stably synchronize and wave, even during a transient period, until a signal for wave detection is locked to the carrier of a received signal (composite video signal).

The above object can be achieved by a provision of a keyed type synchronization wave detecting circuit which, according to the present invention, includes a phase wave detecting means, a synchronizing signal generating means, a keying pulse generating means, a phase control means, a lock detecting means, and a means for generating the signal for wave detection. The phase wave detecting means synchronizes and wave detects a composite video signal responsive to a signal for wave detection. The synchronizing signal generating means provides a horizontal synchronizing signal controlled by the frequency of a horizontal synchronizing signal of the composite video signal. The keying pulse generating means outputs a keying pulse signal from the horizontal synchronizing signal of the synchronizing signal generating means.

The phase control means provides an error signal which approaches an error component generated in accordance with the difference in phase between the signal for wave detection and a carrier of the composite video signal to a predetermined level. The phase control means includes a comparing means for performing a keying outputting operation of the error signal by the input of the keying pulse signal during a period of the keying pulse signal and filter means for removing a high frequency component of the error signal and forming a control signal. The phase control means further includes a sample-and-hold means for sampling and holding the control signal provided in accordance with the keying outputted error signal and for generating a control signal.

The lock detecting means controls the output of at least the keying pulse signal to the phase control means when it is detected that the signal for wave detection is phase-locked to the carrier. The means for generating the signal for wave detection is controlled to provide the signal for wave detection synchronized with the carrier responsive to the control signal generated by the phase control means.

The filter means can include a plurality of filter elements having different time constants. When the lock detecting means detects the phase-locking state, a filter element having a small time constant is selected.

The lock detecting means preferably detects whether or not the phase and frequency of the signal for wave detection are locked to those of the carrier during the period that the synchronizing signal of the composite video signal is present.

In the synchronization wave detecting circuit according to the present invention, the synchronizing signal generating means provides a horizontal synchronizing signal responsive to the frequency of the horizontal synchronizing signal of the composite videosignal. The keying pulse generating means outputs the keying pulse signal having predetermined pulse width and timing responsive to the horizontal synchronizing signal.

The phase control means outputs as an error signal for approaching an error component generated in accordance with the difference in phase between the signal for wave detection and the carrier of the composite video signal to a predetermined level. The phase control means keys the error signal during a period of the keying pulse when the keying pulse signal is input, and filters the error signal with predetermined filter characteristics and outputs the filtered error signal as a control signal. Further, the phase control means samples and holds at least the control signal based upon the keying output and outputs the control signal to the wave detection signal generating means. The wave detection signal generating means provides the signal for wave detection phase-controlled by this control signal.

The lock detecting means supplies the keying pulse signal to the phase control means to perform the keying control when the lock detecting means detects the locking state of the frequency and phase of the signal for wave detection with respect to the carrier.

Therefore, in the phase wave detecting means, the synchronization wave detecting operation of the sequential system is performed when the frequency and phase of the signal for wave detection are not locked to those of the carrier. After this locking operation, the synchronization wave detecting operation of the keyed system is performed.

The filter elements having different time constants are selected on the basis of the locking state of the lock detecting means. Accordingly, it is possible to rapidly achieve phase lock by both the sequential and keyed systems.

Further, the lock detecting means detects whether or not the frequency and phase of the signal for wave detection are locked to those of the carrier during the synchronizing signal period of the composite video signal. Accordingly, the signal for wave detection is not influenced by the video signal.

BRIEF DESCRIPTION OF THE DRAWING

The presently preferred embodiment of the invention will be described in greater detail in conjunction with the accompanying drawing in which:

the sole figure is a block diagram showing a keyed type synchronization wave detecting circuit in accordance with one embodiment of the present invention.

DETAILED DESCRIPTION OF THE PREFERRED EMBODIMENTS

The sole figure is a block diagram showing a keyed type synchronization wave detecting circuit in accordance with one preferred embodiment of the invention. A tuner circuit 1, shown having an antenna coupled thereto in the figure, provides a received signal via a surface acoustic wave filter circuit (SAWF) 3 to a video intermediate frequency (IF) amplifying circuit 5 for converting the received signal to an IF signal. The video IF amplifying circuit 5 has a conventionally known circuit construction for amplifying a composite video signal. A first output of video IF amplifying circuit 5 is coupled to an input of a phase wave detecting circuit 7, and a second output of video IF amplifying circuit 5 is coupled to an input of an automatic phase control circuit (APC) 9 described later.

The phase wave detecting circuit 7 constitutes a phase wave detecting means and performs a switching operation with respect to the composite video signal input thereto by a signal for wave detection synchronized with a carrier of the composite video signal, and thus outputs a modulating wave signal. This construction of the phase wave detecting circuit 7 is a conventionally known circuit construction. A wave detecting output of the phase wave detecting circuit 7 is supplied to a subsequent section described below.

An output of the phase wave detecting circuit 7 is coupled to a synchronization detecting circuit 11 for detecting a horizontal synchronizing signal in the composite video signal. Synchronization detecting circuit 11 has an output coupled to an automatic frequency control circuit (AFC) 13.

The AFC circuit 13 compares the frequency of the horizontal synchronizing signal from the synchronization detecting circuit 11 with the frequency of an oscillating signal from a first voltage controlled oscillator circuit (VCO) 17 described later. The AFC circuit 13 then outputs to a filter circuit 15 an error signal having a voltage level which is fed back to VCO 17 to adjust its frequency. This feedback tends to force the output of AFC circuit 13 to a constant voltage level. The filter circuit 15 is a loop filter for converting the error signal from AFC circuit 13 to a direct current signal used to control the first VCO circuit 17.

The first VCO circuit 17 oscillates to provide a signal having a frequency of substantially equivalent to the frequency 15.75 KHz) of the horizontal synchronizing signal for example on the basis of the DC converted error signal. First VCO 17 supplies its output signal via a first output to the AFC circuit 13 and via a second output to a synchronization pulse generating circuit 19. Operating in conjunction with one another the AFC circuit 13, the filter circuit 15, and the first VCO circuit 17 constitute a phase locked loop (PLL) circuit for providing a signal locked to the frequency of the horizontal synchronizing signal.

The oscillating frequency of the first VCO circuit 17 does not necessarily have to be the same as that of the frequency of the horizontal synchronizing signal. Various alternatives will occur to those of ordinary skill in the art to which this invention pertains. For example, multiples or sub-multiples of the horizontal synchronizing signal and various multiplier and divider arrangements could be used.

The stability of the oscillating frequency can be improved by oscillating at a high frequency, for example, about 31 times the frequency of the horizontal synchronizing signal, and by performing the feedback operation using a signal having a low frequency provided by dividing the oscillated frequency being coupled to the AFC circuit 13.

The synchronization pulse generating circuit 19 generates a synchronizing signal based on the oscillating signal from the first VCO circuit 17. A synchronizing signal generating means 21 is constituted by cooperative operation of the synchronization detecting circuit 11, the AFC circuit 13, the filter circuit 15, the first VCO circuit 17 and the synchronization pulse generating circuit 19.

The synchronization pulse generating circuit 19 provides an output to a keying pulse generating circuit 23 for setting a pulse width and an output timing of the synchronizing signal and outputting a keying pulse signal. The keying pulse signal from the keying pulse generating circuit 23 is supplied to an input of APC circuit 9 through a first switch circuit 25. A keying pulse generating means 27 is constituted by the cooperative operation of the keying pulse generating circuit 23 and the first switch circuit 25.

The first switch circuit 25 is turned on and off by a switching signal from a lock detecting circuit 29.

The APC circuit 9 performs as a comparing means which compares in phase the carrier of the composite video signal from the video IF amplifying circuit 5 and a signal for wave detection from a second VCO circuit 31 and detects a phase difference (error component) therebetween . The APC circuit 9 then outputs to a filter switching circuit 33 an error signal provided such that this phase difference approaches a predetermined level. Further, when the APC circuit 9 connects to the keying pulse generating circuit 23 through the first switch circuit 25 and ready for inputting the keying pulse signal, the APC circuit outputs the error signal only during a period of the keying pulse signal. That is, the error signal is set to be output only when the keying pulse signal is input to the APC circuit 9 from the keying pulse generating circuit 23. The keying outputting operation of the error signal from the APC circuit 9 is performed during the period when the keying pulse signal is outputted.

The filter switching circuit 33 acts as a filter means which constitutes a loop filter for removing a high frequency component and a noise component of the error signal from the APC circuit 9 and outputting a direct current control signal. This filter switching circuit 33 determines a pull-in lock range of the oscillating frequency of the second VCO 31.

Filter switching circuit 33 comprises a first filter element having a predetermined time constant and a second filter element having a time constant smaller than that of the first filter element although these filter elements are not shown in the figure. The first and second filter elements are selectively switched by a switching signal from a lock detecting circuit 29.

The first filter element has a wide lock range and is selected when the lock detecting circuit 29 does not detect a lock condition (explained later), and the second filter element has a narrow lock range and is selected when the lock condition is detected by the circuit 29. Both first and second filter elements can be employed in the keyed and sequential systems. According to the embodiment of the invention, the first filter element is selected in the sequential system and the second filter element is selected in the keyed system.

The filter switching circuit 33 is connected to a sample-and-hold circuit 37 through a second switch circuit 35. This second switch circuit 35 switches the direct current control signal from the filter switching circuit 33 so as to control whether or not it passes through the sample-and-hold circuit 37. This switching operation is controlled by the switching signal from the lock detecting circuit 29.

The sample-and-hold circuit 37 is constructed by a well-known circuit for performing a sample-holding operation at a predetermined timing with respect to a control signal from the second switch circuit 35, and is connected to the second VCO circuit 31.

A phase control means 39 is constituted by the cooperative operation of APC circuit 9, the filter switching circuit 33, the second switch circuit 35 and the sample-and-hold circuit 37.

The second VCO circuit 31 provides a signal for wave detection changed in phase in accordance with the voltage level of the control signal from the second switch circuit 35 or the sample-and-hold circuit 37. This second VCO circuit 31 outputs the signal for wave detection delayed by 45° in phase to the phase wave detecting circuit 7 through a first phase adjusting circuit 41, and outputs the signal for wave detection advanced by 45° in phase to the APC circuit 9 through a second phase adjusting circuit 43. The second VCO circuit 31 constitutes a means for generating the signal for wave detection.

The APC circuit 9, the filter switching circuit 33, the second switch circuit 35, the sample-and-hold circuit 37 and the second VCO circuit 31 operate cooperatively to constitute a PLL (phase locked loop) circuit for controlling the outputting operation of the signal for wave detection having a frequency and a phase locked to those of the carrier of the composite video signal.

The lock detecting circuit 29 performs as a lock detecting means which compares the carrier signal from the phase wave detecting circuit 7 with the signal for wave detection from the APC circuit 9, and performs the selecting operation as to whether or not the frequency and phase of the signal for wave detection are locked to those of the carrier.

When the lock detecting circuit 29 detects the locking state of the frequency and the phase, this circuit 29 outputs a switching signal to the first switch circuit 25, the second switch circuit 35 and the filter switching circuit 33, thereby connecting the keying pulse signal generating circuit 23 to the APC circuit 9. Further, the lock detecting circuit 29 selects the second filter element of the filter switching circuit 33 and controls to output the control signal from the filter switching circuit 33 to the sample-and-hold circuit 37.

The lock detecting circuit 29 detects the status of frequency and phase locking state of the signal for wave detection, i.e., whether or not the signal for wave detection is locked to the carrier during the period of the horizontal synchronizing signal of the composite video signal.

The operation of the synchronization wave detecting circuit of the present invention constructed above will next be described.

A composite video signal selected and converted with respect to frequency by the tuner circuit 1 is amplified by the video intermediate frequency amplifying circuit 5 through the surface acoustic wave filter (SAWF) circuit 3 and is then input to the phase wave detecting circuit 7.

The phase wave detecting circuit 7 performs the synchronizing operation and the wave detecting operation with respect to the input composite video signal by the signal for wave detection from the second VCO circuit 31. This signal for wave detection is formed as follows.

The horizontal synchronizing signal of the composite video signal is detected by the synchronization detecting circuit 11. The frequency of this horizontal synchronizing signal is compared by the AFC circuit 13 with the frequency of the oscillating signal from the first VCO circuit 17. Then, an error signal for making the oscillating frequency from the first VCO circuit 17 to approach the frequency of the horizontal synchronizing signal is supplied to the first VCO circuit 17 through the filter circuit 15.

The first VCO circuit 17 changes the oscillating frequency based on this error signal and outputs a signal having the changed frequency to the AFC circuit 13. Further, the first VCO circuit 17 controls to output the oscillating signal frequency locked to the frequency of the horizontal synchronizing signal to the synchronization pulse generating circuit 19.

The synchronization pulse generating circuit 19 forms a synchronization pulse from this oscillating signal and outputs this pulse to the keying pulse generating circuit 23.

The keying pulse generating circuit 23 determines the width of this synchronizing signal and the timing for performing the keying operation in the APC circuit 9, and outputs the keying pulse signal to the APC circuit 9 through the first switch circuit 25.

When the signal for wave detection from the second VCO circuit 31 is not locked in frequency and phase to the carrier of the composite video signal, no switching signal is output from the lock detecting circuit 29 and no keying pulse signal is output from the first switch circuit 25 to the APC circuit 9.

The APC circuit 9 compares the carrier of the composite video signal and the signal for wave detection with respect to frequency and outputs to the filter switching circuit 33 the error signal for making the difference in phase between these signals to approach a predetermined value. The filter switching circuit 33 selects the first filter element and outputs a predetermined direct current control signal to the second switch circuit 35. In this condition, the second switch circuit 35 selects the second VCO circuit 31 and, therefore, the control signal is directly supplied to the second VCO circuit 31 without passing through the sample-and-hold circuit 37.

The second VCO circuit 31 controls the oscillating operation of the signal for wave detection changed in phase in accordance with the voltage level of the control signal, and outputs the signal for wave detection to the phase wave detecting circuit 7 through the phase adjusting circuit 41. Thus, the phase wave detecting operation in the sequential system is performed in the phase wave detecting circuit 7.

When the operation of the wave detecting circuit is stable and the frequency and phase of the signal for wave detection from the second VCO circuit 31 are locked to those of the carrier of the composite video signal, the lock detecting circuit 29 detects this locking state and outputs the switching signal to the first switch circuit 25, the second switch circuit 35 and the filter switching circuit 33.

Therefore, the keying pulse signal generating circuit 23 is connected to the APC circuit 9 and, therefore, the keying pulse signal is inputted into the APC circuit 9. Then, the error signal from the APC circuit 9 is keying outputted during the period of the keying pulse signal, and the error signal is then supplied to the filter switching circuit 33.

The filter switching circuit 33 selects the second filter element by the switching signal from the lock detecting circuit 29 and the error signal is filtered by the filter characteristics having a narrow lock pull-in range of the frequency. The filtered signal is then supplied to the second switch circuit 35.

Since the second switch circuit 35 selects the sample-and-hold circuit 37, the control signal keying outputted is sampled and held by the sample-and-hold circuit 35 at a predetermined time period, and then the control signal is supplied to the second VCO circuit 31. The second VCO circuit 31 oscillates by the control signal under the PLL lock state.

When the signal for wave detection becomes unlocked for some reason, the lock detecting circuit 29 detects this unlocked condition and the synchronization wave detecting operation of the above-mentioned sequential system is selected and performed.

In the keyed type synchronization wave detecting circuit of the present invention, the synchronization wave detecting operation of the sequential system is performed until the frequency and phase of the signal for wave detection supplied to the phase wave detecting circuit 7 are locked to those of the carrier of the composite video signal. The wave detecting operation of the keyed system is performed after the frequency and phase of the signal for wave detection is locked to that of the carrier of the composite video signal, that is, the PLL is locked. Accordingly, the wave detecting operation does not become unstable in the transient period toward the operation of the keyed system.

Further, the lock detecting circuit 29 detects whether or not the frequency and phase of the signal for wave detection are locked to those of the carrier in the period of the horizontal synchronizing signal in the carrier of the composite video signal, thereby operating the synchronization wave detecting circuit. The carrier has a relatively stable waveform during the period in which the horizontal synchronizing signal is present. During this time wave detecting operation is not influenced by the change in composite video signal, etc.

Other than the above-described embodiment, various changes and arrangements may be applicable inasmuch such does not exceed the scope of the invention. For example, the sample-and-hold circuit 37 may be selected within the wave detecting operation of the sequential system. That is, the sample-and-hold circuit 37 may be employed both in the keyed and sequential systems so far as at least the sample-and-hold circuit 27 samples and holds the control signal in accordance with the error signal keying outputted.

In accordance with the present invention, the synchronization wave detecting operation of the sequential system is performed when the frequency and phase of the signal for wave detection are not locked to those of the carrier of the composite video signal. The synchronization wave detecting operation of the keyed system is performed after the frequency and phase of the signal for wave detection are locked to those of the carrier. Accordingly, it is possible to perform a stable wave detecting operation even during the transient period until the signal for wave detection is locked to the carrier of the received signal. Therefore, it is possible to minimize distortion of a signal in wave detection so as to provide a better image.

The filter elements having different time constants from one another are selected on the basis of the locking state of the lock detecting means so that it is possible to rapidly provide the locking state of the signal for wave detection by both the sequential and keyed systems with respect to the carrier.

The lock detecting means detects whether or not the phase and frequency of the signal for wave detection are locked to those of the carrier in the period of the synchronizing signal of the composite video signal. Accordingly, it is possible to form a more accurate signal for wave detection which is not influenced by the content of an image.

What is claimed is:

1. A keyed type synchronization wave detecting circuit comprising:
   phase wave detecting circuit means for synchronizing and wave detecting a composite video signal, said phase wave detecting circuit means being responsive to a signal for wave detection and a received signal;
   synchronizing signal generating means for providing a horizontal control signal controlled by a frequency of a horizontal synchronization portion of said composite video signal;
   keying pulse generating means for providing a keying pulse signal responsive to said horizontal control signal;
   phase control means for outputting a control signal, said phase control means having a locked and an unlocked state and comprising:
   comparator means for outputting a phase error signal responsive to said signal for wave detection and a carrier of said composite video signal, said comparing means in said locked state keying said phase error signal in response to said keying pulse signal,
   filter means for removing high frequency components of said phase error signal and outputting a filtered error signal as said control signal in said unlocked state, and sample-and-hold means for sampling and holding said filtered error signal and for outputting said control signal in said locked state;

lock detecting means for controlling whether said phase control means is in said locked or unlocked state on the basis of whether said signal for wave detection is phase-locked to carrier; and means for generating the signal for wave detection synchronized with said carrier based on said control signal from said phase control means.

2. A keyed type synchronization wave detecting circuit as claimed in claim 1, wherein said filter means comprises a first filter element having a first time constant and a second filter element having a second time constant greater than the first time constant, the first filter element being selected by said lock detecting means when said lock detecting means detects the phase-locking state.

3. A keyed type synchronization wave detecting circuit as claimed in claim 1, wherein said lock detecting means comprises means for detecting whether the phase and frequency of said signal for wave detection are locked to those of said carrier during a synchronizing signal period of said composite video signal.

4. A keyed type synchronization wave detecting circuit as claimed in claim 2, wherein said lock detecting means comprises means for detecting whether the phase and frequency of said signal for wave detection are locked to those of said carrier during a synchronizing signal period of said composite video signal.

* * * * *